July 7, 1936.  L. K. MAHAFFEY  2,046,521
MEANS FOR PREVENTING FORMATION OF ICE ON AIRCRAFT
Filed March 28, 1934  2 Sheets-Sheet 1
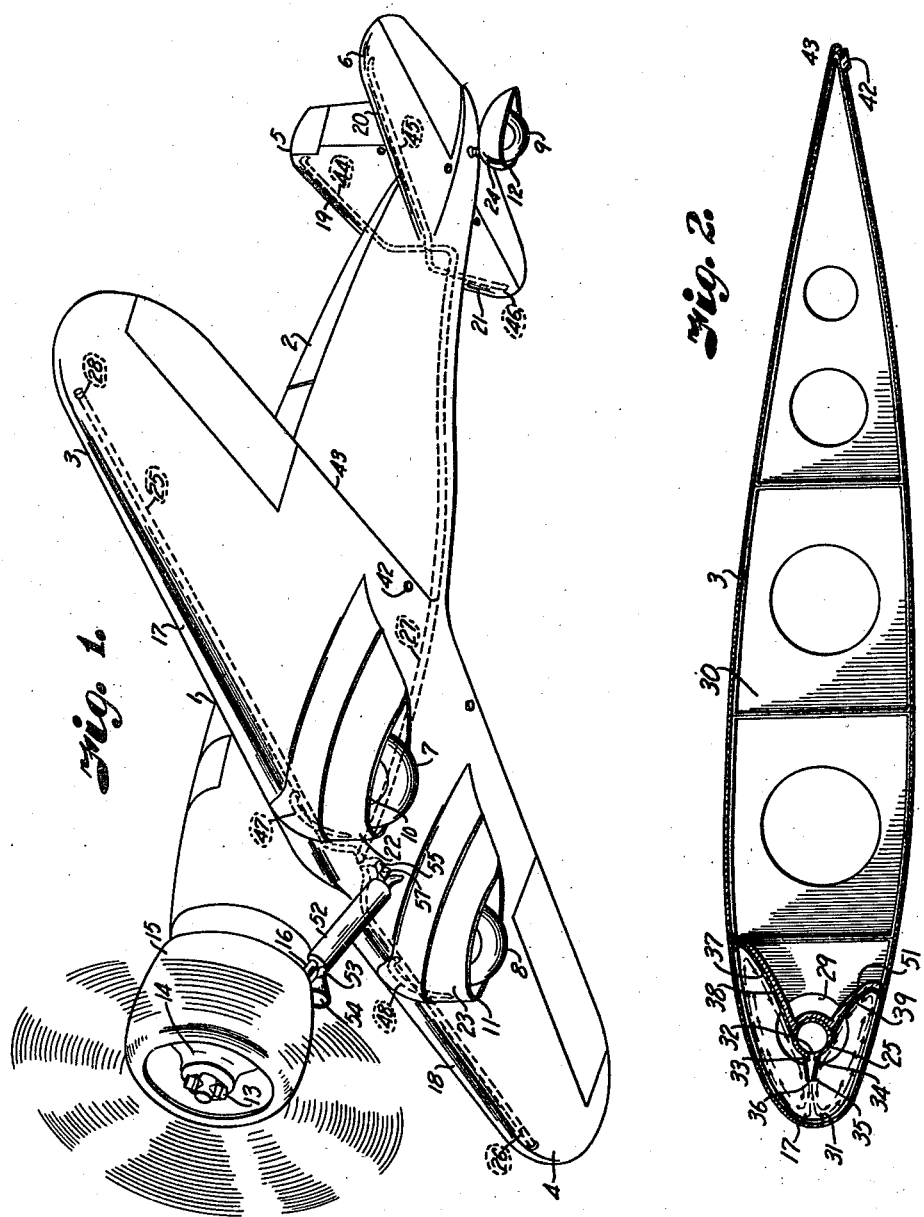
INVENTOR
Lawrence K. Mahaffey.
BY
ATTORNEY

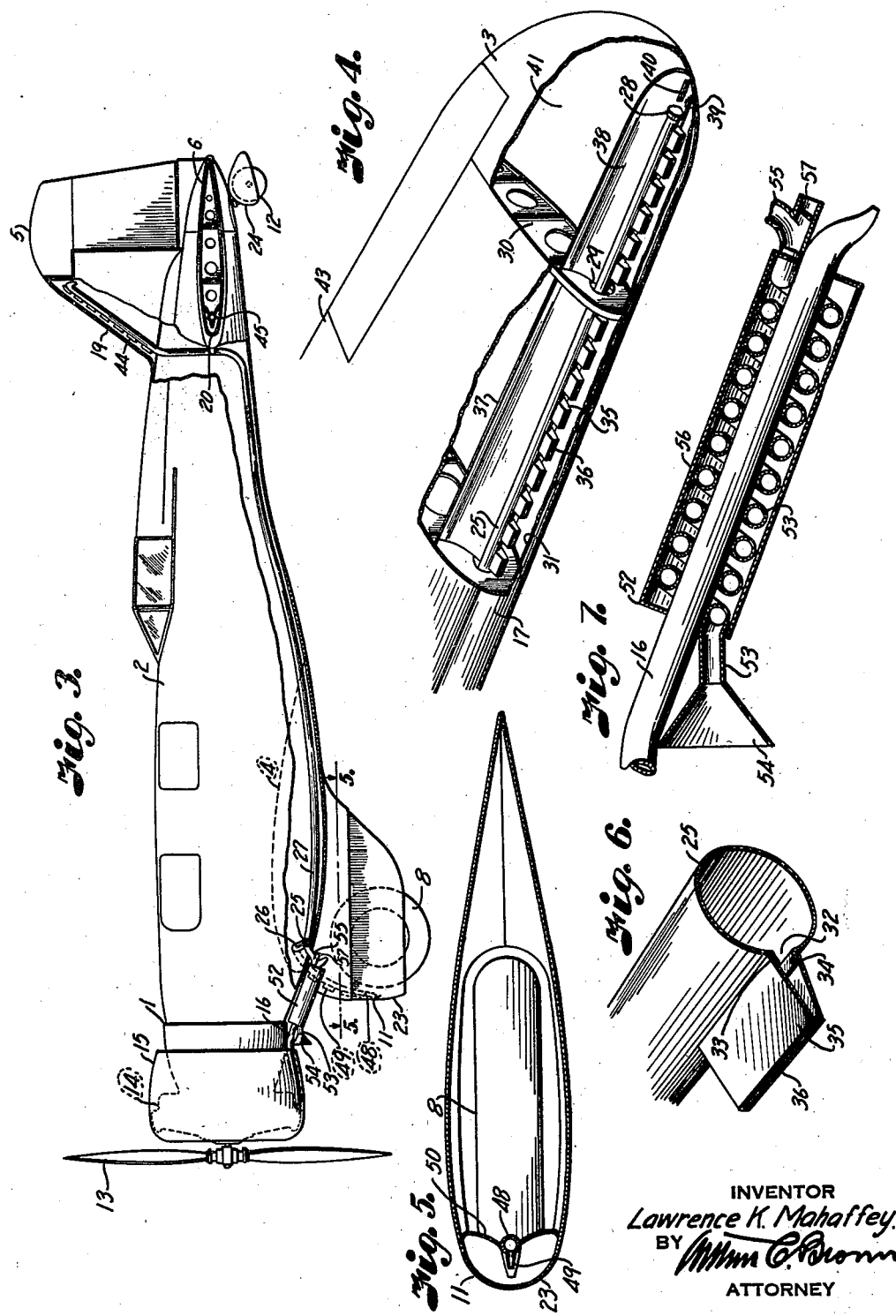

Patented July 7, 1936

2,046,521

UNITED STATES PATENT OFFICE 2,046,521

MEANS FOR PREVENTING FORMATION OF ICE ON AIRCRAFT

Lawrence K. Mahaffey, Columbus, Ohio

Application March 28, 1934, Serial No. 717,745

6 Claims. (Cl. 244—31)

My invention relates to air craft, and more particularly to means for preventing formation of ice on the surfaces of an air craft during flight.

It is known that ice is apt to form on all surfaces of an air craft that are exposed to the air stream such as the leading edges of the wings, pants, elevators, fins and other exposed extraneous parts. This ice formation is at present one of the greatest handicaps to aviation for the reason that it causes forced landings, interferes with schedules, and in some instances the surfaces of the air craft become so loaded with ice that the increased weight, drag, and change in the aerodynamic surfaces make it impossible to remain aloft. Many attempts have been made, and various methods have been devised, to prevent accumulation of ice but they have not proven entirely satisfactory because of greatly added weight, of increased fire hazards, sacrifice of strength in construction, and changes in the aerodynamic shape of the wing structure to accommodate various forms of heaters, ice breakers and the like.

It is therefore the principal object of the present invention to provide means for efficiently preventing accumulation of ice without altering the aerodynamic shapes of the air craft parts, that does not create a fire hazard and which in no way weakens the air craft structure.

In accomplishing these and other objects of my invention, I have provided improved details of structure, the preferred form of which is illustrated in the accompanying drawings, wherein:

Fig. 1 is a perspective view of an airplane equipped with my invention.

Fig. 2 is an enlarged detail cross-sectional view through one of the wings showing the method of heating its leading edge to prevent formation of ice.

Fig. 3 is a side elevational view of the airplane, parts of which are broken away to better illustrate the conduits for distributing heated air to selected parts of the airplane on which ice is apt to form.

Fig. 4 is an enlarged detail perspective view of the tip portion of one of the wings, with the covering broken away to better illustrate the construction of the air distributing conduit and its nozzles.

Fig. 5 is a horizontal section through the landing gear on the line 5—5, Fig. 3.

Fig. 6 is an enlarged detail perspective view through one of the distributing conduits.

Fig. 7 is a detail sectional view of the heater employed for heating and distributing air through the respective conduits.

Referring more in detail to the drawings:

1 designates a conventional type of air craft including a fuselage 2, wings 3, and 4, vertical and horizontal tail fins 5 and 6, landing wheels 7, 8 and 9, which are enclosed in pants 10, 11 and 12, and a propeller 13 driven by an engine 14 that is enclosed in a cowling 15, and provided with an exhaust pipe 16 for leading the hot exhaust gases away from the engine cylinders.

Modern airplanes of the type illustrated are constructed with as few extraneous parts as possible and these are covered with cowling that is stream lined and filleted, not only with the view of reducing air resistance, but to eliminate as far as possible the surfaces upon which ice and sleet may form. Due to this practice ice first accumulates directly on the leading edges in the direct line of the air stream, but the action of the air moving over the sides of the stream-line surfaces tends to keep the other parts free of ice. However, as the ice builds up on the leading edges it gradually extends over the sides thereof due to the fact that the ice formation changes the effect of the stream-lines. Consequently, if the leading edges can be kept clear of ice, the entire stream-lined surfaces can be kept clear.

In an airplane of the type illustrated ice tends to form along the leading edges 17 and 18 of the wings, 19, 20 and 21 of the tail group, and 22, 23 and 24 of the pants, respectively. I, therefore, provide for heating these surfaces from the interior of the wings and cowling by concentrating jets of hot air directly against the interior of the leading edges of the airfoil on which the ice begins to form and to maintain streams of hot air in circumvolution along the inner surfaces of said airfoil for a short distance to the rear of such surfaces, where the streams of hot air are diverted to be redirected against the leading edge.

In carrying out this idea, within the wing structures I provide conduits 25 and 26 extending longitudinally of the wings from the point where they join the fuselage to the tip thereof, as shown by the dotted lines in Fig. 1. The adjacent ends of the conduits are connected with a supply conduit 27 extending longitudinally of the bottom of the fuselage while the outer ends thereof are closed by caps 28. The conduits extend freely through the lightening holes 29 in the rib structure 30 of the wings and are spaced from the inner curved surface 31 of the wing covering as best shown in Fig. 2. The conduits are provided along their forward edges with a series of openings or slots 32 that are provided by punching portions thereof outwardly to form lips 33 and 34 for attaching nozzles 35.

The nozzles 35 have their inner ends conforming in shape to the openings but the walls thereof taper toward their outer ends to concentrate the hot air streams emitted through said opening and to direct them at high velocity directly against the inner surface of the wing covering whereon the ice first begins to form. The major portion of the heat is thus concentrated at the point where it is most needed.

In order to support the conduits so that the nozzles are pointed in the desired directions I provide supporting plates 37 which also serve to deflect the hot air currents for return flow along with new hot air against the desired points of the wing covering, as later described.

The plates include deflecting portions 38 and 39 extending transversely between the ribs with their upper and lower edges located in substantially sealed contact with the inner surfaces of the wing covering at points spaced to the rear of the conduits. The intermediate portions of the deflector converge forwardly toward the conduits into tangency therewith where they are connected to the conduits by welding or the like. The ends of the plates are in substantially sealed contact with the ribs 30 for preventing loss of heat into the trailing portion of the wing. The hot air stream upon striking the inner surface of the leading edge is divided and deflected rearwardly in wiping contact with the upper and lower wing coverings until it is stopped by the deflectors. Upon contacting the deflectors the hot air is again directed forwardly across the tips of the nozzles, and, aided by the syphoning effect of the air issuing from the nozzles, is again driven against the spot at which the heat is to be centered. It is thus apparent that the air upon being admitted to the forward portion of the wings is kept in constant circumvolution and in wiping contact with the surfaces to be heated. Excess air is discharged through vent openings 40 in the plates 37 and into the rear portion 41 of the wings, from where it is finally vented through suitable openings 42 in the trailing edges 43 of the wings.

The supply conduit extends to the rear of the fuselage where it is connected to branch conduits 44, 45 and 46 in the leading portions of the tail group. The branch conduits are of identically the same construction as the wing conduits and operate to heat the leading edges of tail group surfaces in the same manner.

Extending from the ducts 25 and 26 at points adjacent the landing wheels 8 and 9 are downwardly curved branch conduits 47 and 48 having nozzles 49 for directing heated air against the inner surface of the leading edges of the pants 10 and 11, the branch conduits being supported by plates 50 similar to those previously described for forming the circulating chambers for the heated air.

In order to conserve the heat within the area to be heated, the rear sides of the plates are preferably covered with heat insulating material 51, as shown in Fig. 2.

While the air may be heated in various manners I prefer to employ the hot exhaust gases that are discharged through the exhaust pipe 16, as I find that they furnish an adequate source of heat.

The exhaust pipe 16 is therefore provided with a heat exchanger 52 including an air conduit 53 which is coiled about the exhaust pipe and has a funnel-shaped end 54 positioned in the air stream from the propeller, whereby air is directed at high velocity into the coil 53 where it is heated and discharged through a connection 55 into the air distributing pipe 27.

The coil 53 is preferably enclosed in a housing 56 to confine the heat of the exhaust gases.

The air delivered into the funnel is of sufficient volume and pressure to supply hot air to all of the branch conduits as above described, a valved opening 57 being provided in the connection 55 for regulating the volume and pressure of the supply of hot air to the branches.

From the foregoing it is apparent that I have provided means for efficiently heating the surfaces of an air craft on which ice tends to form so that the temperature thereof is maintained above the freezing point of water, and this is accomplished without creating a fire hazard or otherwise interfering with good air craft construction practice.

What I claim and desire to secure by Letters Patent is:

1. In combination with an airplane wing having a rib structure, and a covering for the rib structure having a curved leading edge portion, an air supply conduit extending transversely of the rib structure within the covering having spaced jetting slots opening toward the leading edge portion of the wing, means for supplying heated air to said conduit, and curved baffles connected with the covering and conduit for supporting the conduit and forming a closed conduit chamber, whereby heated air is circulated for redirection toward said leading edge in response to syphoning action of air jetting through said slots and around the curved partitions of said leading edge and baffles.

2. In combination with an airplane wing having a rib structure, and a covering for the rib structure having a curved leading edge portion, an air supply conduit extending transversely of the rib structure within the covering having spaced jetting slots opening toward the leading edge portion of the wing, means for supplying heated air to said conduit, curved baffles connected with the covering and conduit for forming a closed conduit chamber, whereby heated air is circulated for redirection toward said leading edge in response to syphoning action of air jetting through said slots and around the curved partitions of said leading edge and baffles, and means for exhausting excess air from said closed conduit chamber.

3. In combination with an airplane wing having a rib structure, and a covering for the rib structure having a curved leading edge portion, an air supply conduit extending transversely of the rib structure within said covering having spaced slots opening toward said leading edge portion, deflector plates extending from the air supply conduit in reversely curved relation to the curve of said leading edge portion and terminating at points on the wing covering spaced rearwardly from said leading edge for bracing said conduit in said wing and to provide return flow of circumvolving air across the slots toward said leading edge, and means for supplying heated air to said conduit.

4. In combination with an airplane wing, and a covering for the wing having a curved leading edge portion, an air supply conduit within the covering having spaced slots opening toward said leading edge portion, deflector plates extending from the air supply conduit in reversely curved relation to the curve of said leading edge portion and terminating at points on the wing covering spaced rearwardly from said leading edge to provide return flow of circumvolving air across said slots toward said leading edge, means for supplying heated air to said conduit, and means for exhausting excess air to a trailing edge of said wing.

5. In combination with an aircraft having supporting planes and a tail group, and coverings for the planes and tail group having curved leading edge portions, air supply conduits extending within the coverings having spaced slots opening toward said leading edge portions, nozzles connected with the conduit slots for concentrating air against said leading edge portions, deflector plates extending tangentially from the air supply conduit in reversely curved relation to the curve of said leading edge portions and terminating at points on the coverings spaced rearwardly from said leading edges for supporting said conduits in said planes and tail group and to provide return flow of circumvolving air toward said leading edges, means for supplying heated air to said conduit, and means for exhausting excess air to the trailing edges of said planes and tail group.

6. In combination with an airplane wing having a rib structure, and a covering for the rib structure having a curved leading edge portion, an air supply conduit extending transversely of the rib structure within the covering having spaced slots opening toward the leading edge portion of the wing, nozzles connected with the conduit slots for concentrating air against the leading edge portions of the wing, deflector plates extending tangentially upwardly and downwardly from the air supply conduit in reversely curved relation to the curve of the leading edge portion of the wing and terminating at points on the wing covering spaced rearwardly from said leading edge for supporting said conduit in said wing and to provide return flow of circumvolving air toward said leading edge, means for supplying heated air to said conduit, and means for exhausting excess air to a trailing edge of said wing.

LAWRENCE K. MAHAFFEY.